United States Patent
Giannini

(10) Patent No.: US 6,903,756 B1
(45) Date of Patent: Jun. 7, 2005

(54) MERGED IMAGES VIEWED VIA A VIRTUAL STORAGE CLOSET

(75) Inventor: Robert Giannini, Jersey City, NJ (US)

(73) Assignee: Jarbridge, Inc., Boise, ID (US)

( * ) Notice: Subject to any disclaimer, the term of this patent is extended or adjusted under 35 U.S.C. 154(b) by 0 days.

(21) Appl. No.: 09/527,723

(22) Filed: Mar. 17, 2000

Related U.S. Application Data

(60) Provisional application No. 60/159,476, filed on Oct. 14, 1999, and provisional application No. 60/167,493, filed on Nov. 24, 1999.

(51) Int. Cl.[7] ............................................. G06K 15/00
(52) U.S. Cl. ........................ 345/747; 345/749; 345/771
(58) Field of Search ............................... 345/747, 745, 345/746, 771, 772, 773, 852, 757, 703, 705, 708, 712, 749, 853–855, 817, 808, 809, 812, 811, 821, 825, 828–831; 707/10; 705/14, 26

(56) References Cited

U.S. PATENT DOCUMENTS

| | | | |
|---|---|---|---|
| 4,149,246 A | 4/1979 | Goldman | 364/200 |
| 4,232,334 A | 11/1980 | Dyson | 358/93 |
| 4,261,012 A | 4/1981 | Maloomian | 358/93 |
| 4,297,724 A | 10/1981 | Masuda et al. | 358/93 |
| 4,434,467 A | 2/1984 | Scott | 364/400 |
| 4,539,585 A | 9/1985 | Spackova et al. | 358/93 |
| 4,546,434 A | 10/1985 | Gioello | 364/300 |
| 4,731,743 A | 3/1988 | Blancato | 364/521 |
| 4,845,636 A | 7/1989 | Walker | 364/479 |
| 4,872,056 A | 10/1989 | Hicks et al. | 358/183 |
| 4,964,043 A | 10/1990 | Galvin | 364/401 |
| 4,991,005 A | 2/1991 | Smith | 358/93 |
| 5,053,956 A | 10/1991 | Donald et al. | 364/401 |
| 5,111,392 A | 5/1992 | Malin | 364/401 |
| 5,117,354 A | 5/1992 | Long et al. | 364/401 |
| 5,163,006 A | 11/1992 | Deziel | 364/470 |
| 5,163,007 A | 11/1992 | Slilaty | 364/470 |
| 5,206,804 A | 4/1993 | Thies et al. | 364/401 |
| 5,339,252 A | 8/1994 | White et al. | 364/468 |
| 5,440,479 A | 8/1995 | Hutton | 364/401 |

(Continued)

OTHER PUBLICATIONS www.weddingchannel.com, link to registry.*
www.amazon.com(*not enclosed*).
http://jsharones.com/prod013234.h(*not enclosed*).
http://www.cspring.com/aero_lettering/c_match.htm(*not enclosed*).

(Continued)

*Primary Examiner*—Steven Sax

(57) ABSTRACT

An e-commerce method involves on-line viewing of a first article through a linking node for virtual merging on another structure. A particular application of the invention is directed to a method of on-line apparel shopping. The method includes providing a host-site accessible to an on-line viewer (customer) and web-linkable to a retailer having an apparel site. The retailer's apparel site has images of articles stored in a virtual closet. These articles can be apparel from retail stores for viewing over the web, and the on-line viewer is linked to the host-site. The consumer selects a structure, such as a photograph of a person captured in system memory, in response to a command received by the on-line viewer. Using the host-site, the viewer or customer is linked to the retailer's apparel site and images are passed from that site for view by the customer. Apparel is selected and virtually merged with the structure by forming an image including representations of both the structure and the selected apparel.

12 Claims, 2 Drawing Sheets

U.S. PATENT DOCUMENTS

| | | | | |
|---|---|---|---|---|
| 5,495,568 | A | 2/1996 | Beavin | 395/161 |
| RE35,184 | E | 3/1996 | Walker | 364/479 |
| 5,504,845 | A | 4/1996 | Vecchione | 395/119 |
| 5,515,268 | A | 5/1996 | Yoda | 364/401 |
| 5,530,652 | A | 6/1996 | Croyle | 364/470 |
| 5,550,746 | A | 8/1996 | Jacobs | 364/479.01 |
| 5,551,021 | A | 8/1996 | Harada et al. | 395/600 |
| 5,555,496 | A | 9/1996 | Tackbary et al. | 364/401 |
| 5,559,714 | A | 9/1996 | Banks et al. | 364/479.03 |
| 5,608,852 | A | 3/1997 | Hashimoto et al. | 395/135 |
| 5,611,730 | A | 3/1997 | Weiss | 463/20 |
| 5,680,314 | A | 10/1997 | Patterson et al. | 364/470.03 |
| 5,680,528 | A | 10/1997 | Korszun | |
| 5,684,963 | A | 11/1997 | Clement | 395/226 |
| 5,694,551 | A | 12/1997 | Doyle et al. | 395/226 |
| 5,724,522 | A | 3/1998 | Kagami et al. | 395/226 |
| 5,729,699 | A | 3/1998 | Hashimoto et al. | 395/227 |
| 5,737,729 | A | 4/1998 | Denman | 705/401 |
| 5,742,931 | A | 4/1998 | Spiegelhoff | 705/8 |
| 5,745,681 | A | 4/1998 | Levine et al. | 395/200.3 |
| 5,754,850 | A | 5/1998 | Janssen | 395/615 |
| 5,822,216 | A | 10/1998 | Satchell, Jr. et al. | 364/479.01 |
| 5,822,739 | A | 10/1998 | Kara | 705/410 |
| 5,845,263 | A | 12/1998 | Camaisa et al. | 705/27 |
| 5,850,222 | A | 12/1998 | Cone | 345/418 |
| 5,852,809 | A | 12/1998 | Abel et al. | 705/26 |
| 5,864,851 | A | 1/1999 | Breitbart et al. | 707/8 |
| 5,870,140 | A | 2/1999 | Gillberry | 348/160 |
| 5,870,718 | A | 2/1999 | Spector | 705/26 |
| 5,870,771 | A | 2/1999 | Oberg | 707/502 |
| 5,880,974 | A | 3/1999 | Tarumi et al. | 364/578 |
| 5,884,029 | A | 3/1999 | Brush, II et al. | 395/200.32 |
| 5,892,946 | A | 4/1999 | Woster et al. | 395/680 |
| 5,895,454 | A | 4/1999 | Harrington | 705/26 |
| 5,905,973 | A | 5/1999 | Yonezawa et al. | 705/27 |
| 5,923,324 | A | 7/1999 | Berry et al. | 345/334 |
| 5,930,769 | A | 7/1999 | Rose | 705/27 |
| 5,946,665 | A | 8/1999 | Suzuki et al. | 705/26 |
| 5,950,165 | A | 9/1999 | Shaffer et al. | 704/270 |
| 5,950,173 | A | 9/1999 | Perkowski | 705/26 |
| 5,974,400 | A | 10/1999 | Kagami et al. | 705/26 |
| 5,983,200 | A | 11/1999 | Slotznick | 705/26 |
| 5,983,201 | A | 11/1999 | Fay | 705/27 |
| 5,983,267 | A | 11/1999 | Shklar et al. | 709/217 |
| 5,995,943 | A | 11/1999 | Bull et al. | 705/14 |
| 6,002,885 | A | 12/1999 | Kaneda | 395/500.01 |
| 6,009,413 | A | 12/1999 | Webber et al. | 705/26 |
| 6,026,376 | A | 2/2000 | Kenney | 705/27 |
| 6,026,377 | A | 2/2000 | Burke | 705/27 |
| 6,047,268 | A * | 4/2000 | Bartoli et al. | 705/35 |
| 6,091,417 | A | 7/2000 | Lefkowitz | |
| 6,317,722 | B1 * | 11/2001 | Jacobi et al. | 705/14 |
| 6,366,910 | B1 * | 4/2002 | Rajaraman | 707/5 |
| 6,381,583 | B1 * | 4/2002 | Kenney | 705/26 |
| 6,404,426 | B1 | 6/2002 | Weaver | |
| 6,405,175 | B1 | 6/2002 | Ng | |
| 6,405,176 | B1 | 6/2002 | Toohey | |
| 6,456,938 | B1 * | 9/2002 | Barnard | 701/213 |
| 6,727,928 | B1 * | 4/2004 | Richter | 345/854 |
| 6,771,801 | B1 * | 8/2004 | Fisher et al. | 382/112 |
| 6,785,671 | B1 * | 8/2004 | Bailey et al. | 707/3 |

OTHER PUBLICATIONS www.virtualmakeover.com.

www.sesoft.com/customer/index.html.

"The World's First Whole Body Scanners Bring True Human Forms to Computer Graphics," http://www.cyberware.com/pressReleases/first WB.html (May 11, 1995), 1 page.

"ModaCad Latest to Seek 'Net Gain on Apparel," http://www.apparelnews.net/Archive/082898/fashion/fashfeat.html (Aug. 28, 1998), 3 pages.

"Wicks and Wilson TriForm® BodyScan booth–first time in USA," www.wwl.co.uk.

"Wicks and Wilson announces its first Body Scanning booth," www.wwl.co.uk.

"Wicks and Wilson TriForms® 3D system helps to take goalkeeping into the space age," www.wwl.co.uk.

"Modacad, Inc. Launches Women's E–commerce 'Style' Shopping Site," http//www.urlwire.com/newsarchive/050399a.html (May 3, 1999), 2 pages.

"Populating the Web: Pioneering a paradigm for photo realistic Avatars," http//www.avatarme.com/concept/concept.htm (8/99), 5 pages.

"PhotoModeler High Quality Photo–Textured Objects," http://www.eossystems.comphototex.htm (copyright 1995–1999), 10 pages.

*Land's End Direct Merchants* Catalogue (9/99), p. 101. www.landsend.com.

"Macys.Com To Sell Borderbund Makeover Software," http//dailynews.yayoo.com/h/nm/19990903/tc/macyscom_2.html (Sep. 3, 1999), 2 pages/.

"If the Jeans Fit . . . page 3: Three Hours Later," http//www.upside.com (Sep. 3, 1999), 1 page.

"When Off–The Rack Becomes Off–The–Net," *Scientific American Presents your Bionic Future* (11/99), 5 pages.

"Macy's Eases Swimsuit Fear with Database," http://www-.wired.com/news/news/story/3226.html (Apr. 17, 1997), 2pages.

"Fashion Studio," http://www.dynagraphicsinc.com/main.htm (Sep. 14, 1999), 4 pages.

"What is the Dressing Sim?," http://www.toyobo.co.jp/e/mirai/dr . . . gsim/TopPage/aboutDressingSim.html (Sep. 14, 1999), 5 pages.

Nebojsa Jojic, http://ww.ifp. uiuc.edu/'jojic/ (Sep. 14, 1999), 5 pages.

A Framework for Garment Shopping over the Internet, Jojic et al., *Handbook of Electronic Commerce* (5/99), 22 pages.

Media Motion Publications, Flash 'N Fashion (Copyright1995–1997), 3 pages. www.media–motion.com/.

Meta Creations Poser 4, (Sep. 14, 1999), 3 pages. www-.metacreations.com.

"Finding a Look," *New York Times* (Oct. 14, 1999), 1 page.

"3–D Metrics–Capturing the Dimension of Life," http://www.3dmetrics.com (copyright1999), 1 page.

"Welcome to Click Dress," http://www.hi–pic.co.il/ (Dec. 7, 1999), 1 page.

"Killer Loop Virtual Preview," http://www.killer-loopeyewear,com/html/klvp.html (Dec. 2, 1999), 1 page.

www.peepsun.com.

http://marketwiz.net.

www.pearlvision.com.

www.beyond.com.

http.//orders.xoom.com.

www.itreviews.com.

"Welcome to Ray Ban Virtual Preview," http://www.rayban.com/htm/rbvp.html (Dec. 2, 1999), 2 pages.

* cited by examiner

MERGED IMAGES VIEWED VIA A VIRTUAL STORAGE CLOSET

RELATED PATENT DOCUMENT

This application is based on, and claims priority to, U.S. Provisional Patent Applications, Nos. 60/159,476 and 60/167,493, respectively filed Oct. 14, 1999 and Nov. 24, 1999. Provisional Application No. 60/159,476 has been converted into U.S. application Ser. No. 09/515,354, filed Feb. 29, 2000.

FIELD OF THE INVENTION

The present invention relates generally to e-commerce and, more specifically, to use of linked web servers sites for on-line shopping.

BACKGROUND OF THE INVENTION

The consumer in today's market is limited to a particular retailer's or department store's inventory, selection and styles. Traditionally, a consumer shops for items from different stores with the anticipation and hope that the items will coordinate. Alternatively, a consumer will wait for an opportunity to try on all the different items purchased and return those items that do not coordinate. Recent technological advances have attempted to enhance the shopping ability through the use of c-commerce, sometimes referred to as "online buying" or "online shopping."

There are differences inherent between "online buying" and "online shopping" in that current e-commerce transactions are based on the individual buying goods or services online that they have either decided to buy prior to logging on to the internet or find as a result of bargain hunting on the internet. There is very little, if any, true shopping on the internet. Most women define shopping as an "experience" "fun" "exciting" and the like, True shopping is going to a mall or department store with the intention of buying yet to be deternined goods or services. Few consumers are getting on the internet with the same mindset that they have before they physically go shopping. It is the difference between logging onto the internet to buy an additional pair of Levi's Jeans and going shopping and then coming home with 2 pairs of Levi's Jeans, a belt, 2 sweaters and 2 shirts.

Amazon, for instance, tries to recreate the "shopping experience" by offering reviews by other customers and suggestions for other books which may interest the shopper based on the book the consumer is currently purchasing.

SUMMARY OF THE INVENTION

One aspect of the present invention is generally directed to a method for on-line viewing of an article previously stored in a virtual closet (e.g., an apparel closet) on another structure. An example implementation of this aspect of the present invention includes: providing a host-site accessible to an on-line viewer and web-linkable to at least one article-provider site, the article provider-site having images of articles for view via the web. The on-line viewer is linked to the host-site and to a virtual closet maintained by the host-site. The host-site selects a structure in response to a command received by the on-line viewer, and using the host-site, the viewer is linked to the at least one article-provider site and images (including those in the virtual closet) are passed from that site for view by the on-line viewer, and merging a selected one of the articles with the structure by forming an image including representations of both the structure and the selected article.

Another aspect of the present invention is directed to addressing one of the most crucial features missing when one attempts to shop for clothing and accessories online; this feature is the ability to try the different items on oneself. In addition to the portal concept, this aspect of the present invention more clearly identifies to the consumer the problem, by personalizing and enhancing the "shopping experience" by allowing the consumer to have their own "internet mirror" or "internet fitting room." A personalized, secure environment is created which permits the consumer to truly "shop" at their leisure and convenience. An optional feature allows each user a certain amount of storage capacity, referred to as a "closet," where the user can store different items from multiple stores as they move from store to store, each time bringing back different items to mix and match, coordinate and so on. This storage space allows the consumer to put items "on hold" for a limited period of time without purchasing them. This feature allows consumers to return at a later date and purchase these items and continue shopping for other items without starting the whole process over again.

The above-mentioned main feature is a "body-registry" which enables individuals in purchasing clothing and accessories online to have an enhanced shopping experience by having a "closet" with both their previous and potential purchases to mix and match and create new outfits. For instance, a woman could go to this virtual "closet" and pull out her favorite article (e.g., shirt) and go shopping for a new skirt, shoes, earrings and purse to create a "new outfit."

Another embodiment has fashion advice with latest fashions and styles and links to the retailers that carry those fashions. Retailers could be invited to write-up the commentary or nationally-known magazines may want to offer their fashion advice online.

In another specific embodiment a question and answer section answers common questions such as "What goes with . . . ?" and others. The fashion advice section as it grows includes a search section that would allow the consumer to find past articles relating to their particular interest.

In yet another specific embodiment, a review section, set up by topics, enables a consumer to relate his or her retail experiences, both good and bad, talk fashion and style, give advice, or to talk about items of interest.

The above-identified feature allow a consumer to walk through an entire mall (or different malls) of stores picking and choosing selected item(s) to build the ultimate outfit or wardrobe. A consumer may pause, store, put-on-hold, and shop twenty-four hours per day at his or her convenience.

A more particular example embodiment of the present invention is directed to a method of on-line apparel shopping. The method includes providing a host-site accessible to an on-line viewer (e.g., customer) and web-linkable to an entity, such as a retailer, having an apparel site. The retailer's apparel site has images of articles such as apparel for viewing over the web, and the on-line viewer is linked to the host-site. The consumer selects a structure, such as a photograph of a person captured in system memory, in response to a command received by the on-line viewer. Using the host-site, the viewer or customer is linked to the retailer's apparel site and images are passed from that site for view by the customer. Apparel is selected and virtually merged with the structure by forming an image including representations of both the structure and the selected apparel.

The above summary of the present invention is not intended to describe each illustrated embodiment or every implementation of the present invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
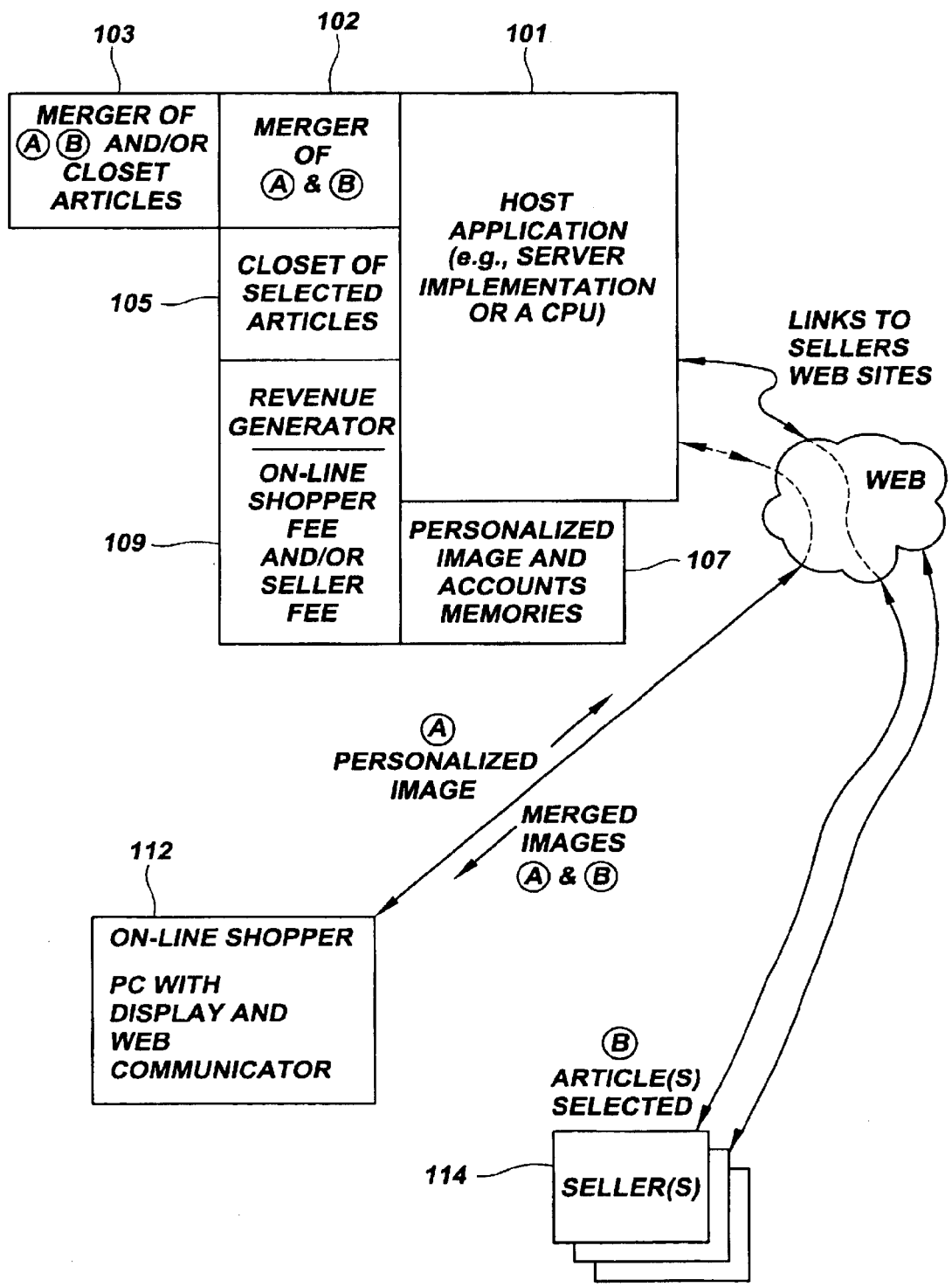
FIG. 1 illustrates a block diagram of a system for implementing the present system in accordance with one example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILRD DESCRIPTION

The present invention is generally directed to a method and system involving e-commerce over interconnected communication networks such as those currently known as the Internet. The present invention is particularly suited for conveniently bringing virtual apparel into customers respective homes and permitting customers to try on the apparel before accepting/purchasing the apparel. While the present invention is not necessarily so limited, a better understanding of the invention will be found by reading the detailed description and exemplary embodiments that follow. FIG. 1 illustrates an example embodiment of a method and system for implementing the present system. The system includes a host application server 101 including several example functional blocks. These blocks include a block 102 that merges two images A and B (e.g. corresponding to a personalized or generic article identified by the on-line shopper, and a foundation or structure image to be merged with the identified article). Another block 103 permits merging of images selected from A, B, and/or articles previously stored in a "closet," depicted as block 105. Another block 107 includes personalized images and an inventory of generic images corresponding to the foundation or structure. A revenue generator block 109 provides fee generation from on-line shoppers who subscribe to the host application server per on-line or off-line agreement, and/or fee generation from retailers (or sellers) and others such as magazine publishers desiring participation and benefit from the system of FIG. 1.

The on-line shopper uses a PC or intelligent black box 112 to access the host application server 101. Through this access, the on-line shopper either selects a generic structure from an inquiry of such structures provided by block 107 or provides a personalized image (for example, a scanned image of himself or of his house) to be used as the structure. Using the host application server 101, the on-line shopper is coupled through the web to a seller, depicted at block 114. Images of selectable articles are communicated back to the on-line shopper over the web and through the host application server 10. The on-line shopper selects one or more articles from at least one of the sellers for storage in the closet 105, and/or for merging with the previously-selected structure. Similarly, the structure can be changed per a command from the on-line shopper so as to merge the selected article(s) with different structures. In response, the host application server 101 processes images corresponding to the article and structure and generates a new image including representations of both the structure and the article.

Figure 2:
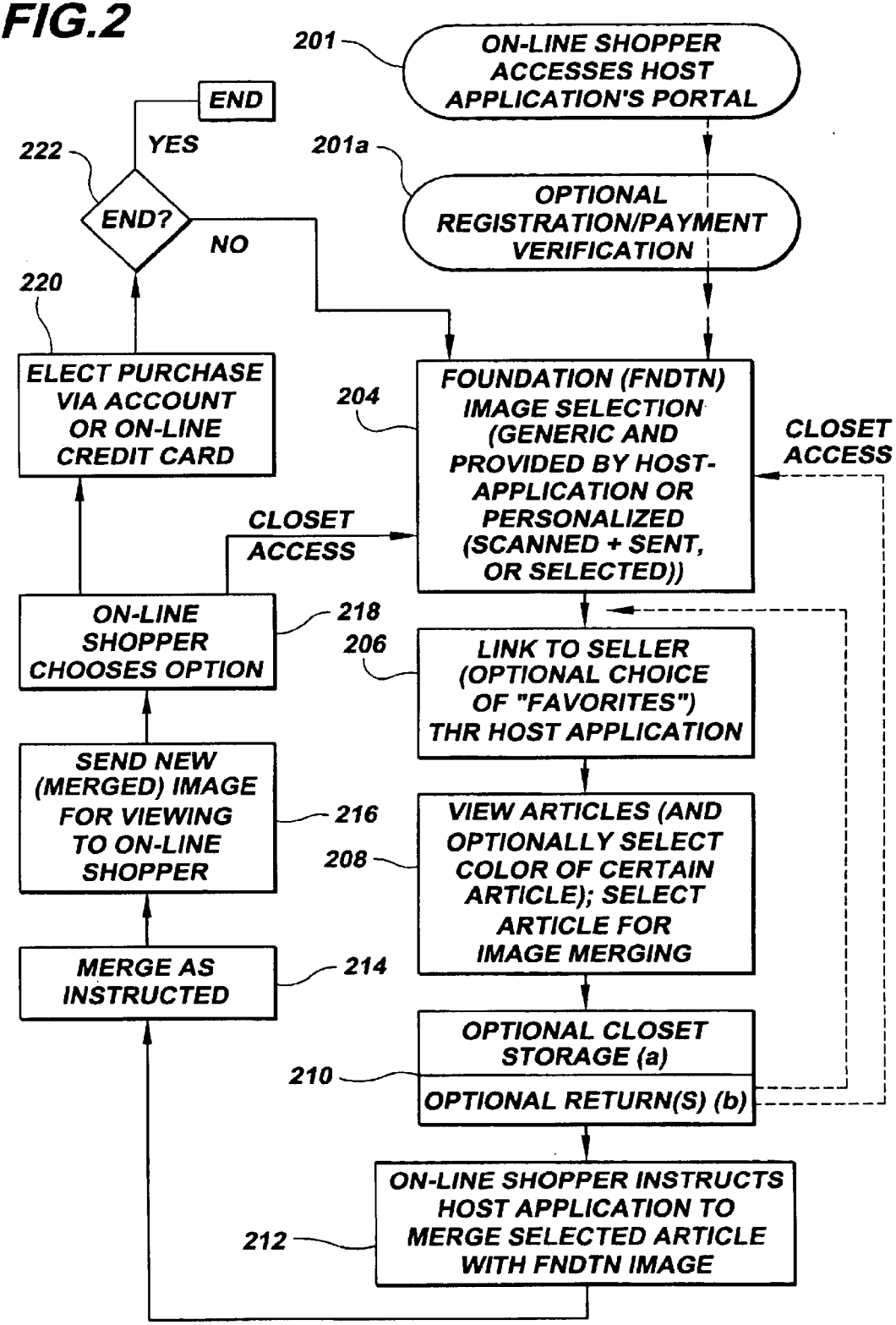
FIG. 2 is a flowchart of an example manner for implementing one aspect of the present invention.

FIG. 2 is a flow chart of an example process for implementing the example system of FIG. 1, according to the present invention. As discussed above, after accessing the host application server 201, optionally the host application server verifies registration/payment as is conventional with current on-line shopping as depicted at 201a. At block 204 the structure or foundation is selected as discussed above, and at block 206a the link is made to the seller. At block 208 the article(s) is viewed by the on-line shopper and, optionally, a selection of a color and/or size for the article is made. Next, the on-line shopper selects the article as a candidate for storage in the closet and/or for merging with the structure.

At block 210 the on-line shopper instructs the host application server to store the article in the closet by returning to block 204, merge with the structure as depicted at block 212, or return to block 206 for linking to the same seller or another seller for additional viewing.

From block 212 flow proceeds to block 214 where the new image is created per the merger instruction.

Next, at block 216, the new image is sent for viewing to the on-line shopper.

At block 218 the on-line shopper chooses one of multiple options. Either the closet is accessed and the on-line shopper returns to block 204, or an election is made to purchase the article and/or other articles that may have been stored in the closet as depicted in block 220. From block 220, flow proceeds to block 222 where the on-line shopper decides to return to block 204 or end the transaction.

Example articles can be: A) clothing; B) paint; C) furniture; D) glassware; E) landscaping; F) orthodontic and teeth ware; G) cabinetry; H) plastic-surgery type enhancements; I) car/person.

Example foundation for merger with corresponding article(s) can be: a) person, pet; b) house, cars, etc.; c) house, cars, office, etc.; d) kitchen, face; e) yard; f) mouth; g) rooms in office/house; h) person (chest, face, belly, etc.); I) person/car.

In another example embodiment according to the present invention, an important advantage relating to color matching is achieved using a commonly-used color standard that covers sufficient color variations to permit various articles to be matched to one another. In one more specific embodiment, an industry color-standardization scheme is used. Examples include: Exxel Color Match Guide (see http://sharones.com/prod013234.htm) and Color match Chart (http://www.csprings.com/aero lettering/c match.htm). More sophisticated color standardization schemes include the above examples in combination with equipment specifically identifying a frequency range corresponding to the color of the article in question or the equipment approach by itself.

Example equipment of this type includes optics-based detectors adapted to provide a measured (color) frequency in a given light condition/environment. For example, white light may be used along with selected background materials characterized within certain selected ranges of reflectivity. Other definitional parameters needed and/or useful in connection therewith will be apparent to those skilled in the art.

In a particular application, the color frequencies measured for the articles to be matched are reported and provided in the form of a tag that is carried with the article, electronically for the web server shopping function and, optionally, as a supplemental hard-copy coded label (e.g., as part of or as a supplementation to the coding used on a bar code label). In a more particular implementation involving this use as part of the bar code label, the conventional bar code scanners and bar code generators are modified and adapted to receive the color frequency of the article and to conveniently report the color frequency in conjunction with the electronic shopping function and/or the conventional/reality shopping applications.

In yet another more specific embodiment, the closet of selected articles (as described for example in connection with block 105 of FIG. 1) is electronically defined using a partial-data set corresponding to each of the closeted articles. In one application thereof, the partial-data set comprises an outline definition of each of the articles along with the color frequency codes linked to the various sections of each article, as necessary to fully defined the article in terms of article shape and color. Further, the size of the article is also stored as part of the partial-data set. Collectively, these various pieces advantageously define all needed aspects of each article in the closet without having to consume excessive amounts of memory and without requiring excessive processing to recreate the article for view by the user.

The virtual closet discussed above in connection with FIG. 1 can be used to permit the shopper to buy or hold (without buying) an article and subsequently retrieving the article for matching to other articles in terms of structure, size, color and other stylistic aspects. In applications concerned with limited memory bandwidth, the host application can provide a maximum amount of storage space for each shopper, with additional storage space being provided for a fee. These data stored in such memory is limited to a fixed-period, e.g., one month, with extensions being provided for yet additional consideration, such as a monthly fee or purchases of items stored in the closet during an immediately preceding period. This approach advantageously encourages the shoppers to revisit the host application repeatedly to access their personalized virtual closet, and advantageously provides on-going advertising for (which is also optionally billed on a related, on-going basis to) the seller/retailers.

According to another aspect of the present invention, on-line shoppers (for example 112 of FIG. 1) are provided a number of selectable icons or other data permitting feedback from the host/server (for example 101 of FIG. 1). Examples include: expert fashion advice (e.g., professional consultants employed by the retailers (for example sellers 114 of FIG. 1), outside fashion consultants and/or employees of the entity providing the host application (101 of FIG. 1); on-line offers from the sellers (discounts, sales, etc.); updates on up-coming styles, colors, the most recent and hottest fashions. Each of these various offerings is optionally categorized for convenient selection by the shopper/user, for example, by category, style, activities, retailers. Advantageously, this application permits the host application to provide the sellers unique demographic information pertaining to particular customers interests, selection trends and other data useful in attracting the shoppers to the retailers.

For convenience to the shoppers, a feedback icon can be used to provide a "favorite retailers" list to be defined by each shopper. When the shopper logs on to the host application, any of these favorite retailers can be immediately linked to for various uses. Examples include: review-ing closeted items and making changes thereto for a particular retailer, checking sales at that particular retailer and/or continuing to shop at a particular retailer without being required to return to the host application web site. Further, as a shopper links from retailer to retailer (the "Favorites"), a "shopping basket" can be selected and filled as the shopper accesses the articles According to another important aspect of the present invention, the host application includes a search engine that searches selected, or all, participating sellers/retailers for particular merchandise, as identified by the on-line shopper. In one implementation, this service is provided to the shopper using a selectable icon or other feedback data as discussed above. At this point, the host application can: list all such retailers and allow the shopper to link to their web site; virtually pull the item from the respective web sites and allow the shopper to "try on" the article or store it in the closet (with a variation which optionally permits the shopper to change the size and color); and/or a combination of these approaches.

Implementation of the merging function can be accomplished using one or more of a variety of currently-available methods. Examples of such methods include those used in connection with web sites:

> www.virtualmakeover. com, and www.segasoft.com/customer/index.html. Other example implementations are described and illustrated in U.S. Pat. No. 5,930,769 entitled, "System and Method for Fashion Shopping." Various types of software and hardware can be used to implement each aspect of the system and method described.

As noted above, the present invention is applicable to a number of techniques for merging various types of structures, or foundations, with one or more corresponding articles. The present invention should not be considered limited to the particular examples described above, but rather should be understood to cover all aspects of the invention as fairly set out in the attached claims. For example, the present invention could be characterized as covering one or more of the above characterized features. Accordingly, various modifications, equivalent processes, as well as numerous structures to which the present invention may be applicable will be readily apparent to the skilled artisan upon review of the present specification.

I claim:

1. A method for on-line viewing of articles, comprising:

providing a host-site that is web accessible to an on-line viewer and web-linkable to different article-provider sites, the article provider-sites having images of articles for view via the web;

linking the on-line viewer to the host-site and receiving a command from the on-line viewer that selects a structure and at least one type of the articles;

using the host-site in response to the command, to link to the different article-provider sites and to pass respective images of articles of said type from the different article-provider sites for view by the on-line viewer via a web link to the host-site;

closeting, in a virtual closet, partial-data sets respectively corresponding to different ones of the passed images; and at the host site generating a composite image from one of the passed images and the structure, the composite image representative for viewing as a single object, the structure modified with the article that corresponds to said one of the passed images.

2. The method of claim 1, wherein the partial data sets include a size code.

3. The method of claim 1, wherein the partial data sets include a code identifying a style.

4. The method of claim 1, wherein closeting further includes storing the passed images for use during a subsequent access to the host-site.

5. The method of claim 1, wherein the host-site is configured and arranged to limit a maximum amount of storage space provided in the virtual storage closet for the on-line viewer, the maximum amount of storage space being limited as a function of a user profile defined for host-site access.

6. The method of claim 1, wherein the host-site is configured and arranged to limit accessibility to the virtual storage closet provided for the on-line viewer to at least one of: a storage space limit, and a time limit.

7. The method of claim 6, wherein the limit is a fixed time limit.

8. The method of claim 6, wherein the limit is a variable time limit set as a function of financial consideration provided by the on-line viewer.

9. The method of claim 6, wherein the limit is a variable time limit reset as a function of periodic financial payments provided by the on-line viewer.

10. An arrangement for on-line viewing of articles, comprising:

a host-site that is web accessible to an on-line viewer and web-linkable to different article-provider sites, the article provider-sites having images of articles for view via the web;

at least one communication circuit adapted to link the on-line viewer to the host-site and to receive a command from the on-line viewer that selects a structure and at least one type of the articles;

a virtual closet for storing partial-data sets respectively corresponding to different ones of the articles and the host-site being further adapted to in response to the command, link to the different article-provider sites and pass respective images of articles of said type from the different article-provider sites for view by the on-line viewer via a web link to the host-site, and generate a composite image from one of the passed images and the structure, the composite image representing, for viewing as a single object, the structure modified with the article that corresponds to said one of the passed images.

11. The arrangement of claim 10, wherein the partial data sets include a size code.

12. The arrangement of claim 10, wherein the host-site is configured and arranged to limit access to the virtual closet as a function of a user profile defined for host-site access.

* * * * *